(12) United States Patent
Chen et al.

(10) Patent No.: US 12,013,564 B2
(45) Date of Patent: Jun. 18, 2024

(54) LIGHT SOURCE MODULE AND DISPLAY DEVICE

(71) Applicant: Coretronic Corporation, Hsin-Chu (TW)

(72) Inventors: Hsin-Wei Chen, Hsinchu County (TW); Wen-Yen Chiu, Hsinchu County (TW); Chao-Hung Weng, Hsinchu County (TW); Ming-Dah Liu, Hsinchu County (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/487,126

(22) Filed: Oct. 16, 2023

(65) Prior Publication Data
US 2024/0126003 A1    Apr. 18, 2024

(30) Foreign Application Priority Data
Oct. 18, 2022    (CN) .......................... 202211270453.7

(51) Int. Cl.
F21V 8/00    (2006.01)
(52) U.S. Cl.
CPC ......... G02B 6/0053 (2013.01); G02B 6/0068 (2013.01); G02B 6/0016 (2013.01)
(58) Field of Classification Search
CPC ... G02B 6/0016; G02B 6/0068; G02B 6/0053
See application file for complete search history.

(56) References Cited

U.S. PATENT DOCUMENTS

| 8,432,628 | B2 | 4/2013 | Shiau et al. |
| 11,009,645 | B2 | 5/2021 | Li et al. |
| 2011/0205756 | A1* | 8/2011 | Kim ..................... G02B 6/0053 362/607 |
| 2020/0233145 | A1* | 7/2020 | Yagi ..................... G02B 6/0036 |
| 2022/0269132 | A1* | 8/2022 | Liu ................... G02F 1/133607 |
| 2023/0288753 | A1* | 9/2023 | Shiau ............... G02F 1/133607 |

FOREIGN PATENT DOCUMENTS

| CN | 206892377 | 1/2018 |
| CN | 112859435 | 5/2021 |
| CN | 114910993 | 8/2022 |
| TW | I613474 | 2/2018 |
| TW | M616691 | 9/2021 |
| TW | I754318 | 2/2022 |

* cited by examiner

*Primary Examiner* — Leah Simone Macchiarolo
(74) *Attorney, Agent, or Firm* — JCIPRNET

(57) ABSTRACT

A light source module and a display device are provided. The light source module includes a light source, a light guide plate, and an optical film set including multiple first optical microstructures having a first surface, multiple second optical microstructures having a second surface, and multiple third optical microstructures having a third surface. Each of the multiple first optical microstructures has a first vertex angle, each of the multiple second optical microstructures has a second vertex angle, and each of the multiple third optical microstructures has a third vertex angle. The third vertex angle is less than the first vertex angle, and the first vertex angle is less than or equal to the second vertex angle. By configuring the aforementioned optical microstructures, the light source module of the disclosure may greatly improve the collimation of light and has favorable luminance.

12 Claims, 8 Drawing Sheets

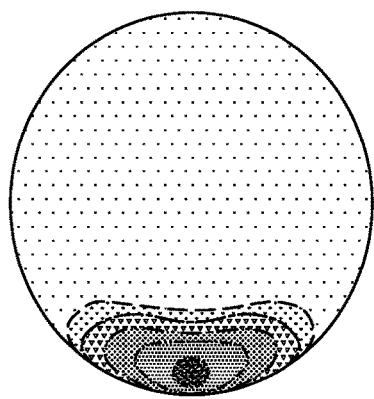 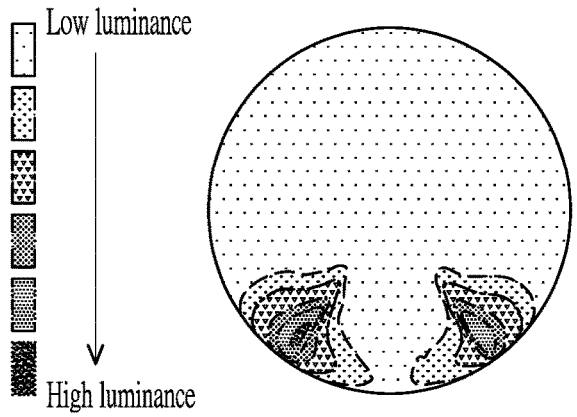 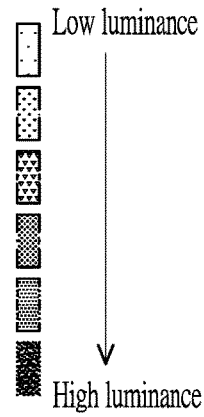
FIG. 3A          FIG. 3B
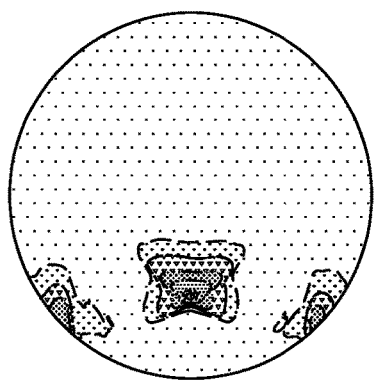 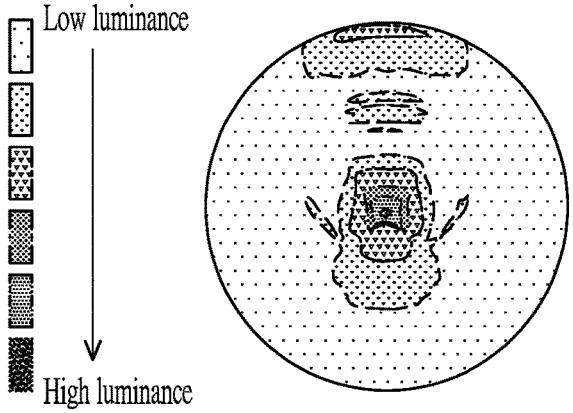 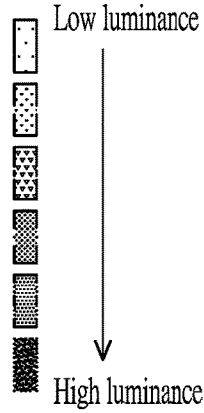
FIG. 3C          FIG. 3D
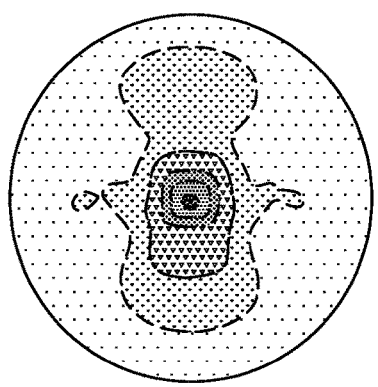 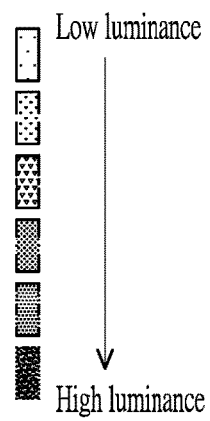
FIG. 3E

LIGHT SOURCE MODULE AND DISPLAY DEVICE

CROSS-REFERENCE TO RELATED APPLICATION

This application claims the priority benefit of China application serial no. 202211270453.7, filed on Oct. 18, 2022. The entirety of the above-mentioned patent application is hereby incorporated by reference herein and made a part of this specification.

BACKGROUND

Technical Field

The disclosure relates to an optical module and an electronic device, and in particular, to a light source module and a display device.

Description of Related Art

With the development of science and technology, display devices have become common electronic devices in daily life. Currently, some display devices provide anti-peeping functions to maintain users' viewing privacy. Moreover, the current display devices mostly use flat panel display modules to display images, among which the technology of the liquid crystal display module is more sophisticated and popular. However, since the display panel of the liquid crystal display module may not emit light by itself, a backlight module is provided under the display panel to provide light required for displaying images.

Backlight modules may be mainly divided into edge-lit backlight modules and direct-type backlight modules. The edge-lit backlight module uses a light guide plate to guide the light emitted by a light source disposed on the light incident side of the light guide plate to the light exiting surface of the light guide plate, thereby forming a surface light source. Generally speaking, when leaving the light exiting surface of the light guide plate, the light will deviate from the normal line. Therefore, it is usually necessary to use a diffusion sheet to diffuse the light in multiple directions, and then collimate the light through the setting of the prism sheet. Next, the collimated light diffuses through the upper diffusion sheet with concealing function, thereby forming the surface light source with sufficient luminance and uniformity.

However, under the aforementioned configuration, due to the configuration of the lower diffusion sheet of the backlight module, the output light shape will have a larger full width half maximum (FWHM) in the horizontal and vertical directions, and may only be controlled to emit light within 50° of the full width half maximum (FWHM) of the viewing angle. Therefore, when the display device needs to be applied to a backlight module with high privacy and anti-peeping requirements whom can provide a narrow viewing angle, the backlight module in the prior art does not meet the product requirements. Therefore, developing a backlight module suitable for a display device with an anti-peeping function is an urgent problem to be solved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a light source module, whom has an output light shape having a narrow viewing angle and favorable luminance.

The disclosure provides a display device with an anti-peeping function and a favorable image quality.

To achieve one or part or all of the above objectives or other objectives, an embodiment of the disclosure provides a light source module. The light source module includes a light source having multiple light emitting elements, a light guide plate whom has a light incident surface facing the multiple light emitting elements, and an optical film set overlapping a light exiting surface of the light guide plate and including multiple first optical microstructures, multiple second optical microstructures, and multiple third optical microstructures. The multiple first optical microstructures have a first surface, in which the multiple first optical microstructures extend along a first direction and face the light guide plate. The multiple second optical microstructures have a second surface, in which the second surface is located on a side of the first surface away from the light guide plate, and the multiple second optical microstructures extend along a second direction and face away from the light guide plate. The first direction is parallel to the second direction. The multiple third optical microstructures have a third surface, in which the second surface is located between the first surface and the third surface, and the multiple third optical microstructures extend along the third direction and face away from the light guide plate. The third direction is orthogonal to the first direction. Each of the multiple first optical microstructures has a first vertex angle, each of the multiple second optical microstructures has a second vertex angle, and each of the multiple third optical microstructures has a third vertex angle. The third vertex angle is less than the first vertex angle, and the first vertex angle is less than or equal to the second vertex angle.

To achieve one or part or all of the above objectives or other objectives, an embodiment of the disclosure provides a display device. The display device includes the aforementioned light source module and a display panel. The display panel is located on a side of an optical film set away from the light guide plate.

Based on the above, in the light source module and the display device of the embodiment of the disclosure, through the configuration of the multiple first optical microstructures, the multiple second optical microstructures, and the multiple third optical microstructures of the optical film, the light source module may greatly improve the collimation of light and realize the viewing angle of the output light shape having a small enough full width half maximum (FWHM) in the horizontal and vertical directions. For example, the full width half maximum (FWHM) of the viewing angle of the output light shape of the light source module in the horizontal and vertical directions may be kept within 24°. In this way, the illumination light beam provided by the light source module may be concentrated toward a specific viewing angle to meet the requirement of collimated light output, thereby enabling the display device to realize the anti-peeping function. In addition, the light source module also improves the optical utilization rate and has favorable luminance, thereby reducing the energy consumption of the light source module and the display device and enabling the display device to have a favorable image quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3A to FIG. 3E are respective schematic diagrams of light fields of the light beam of FIG. 1A after passing through different optical surfaces.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
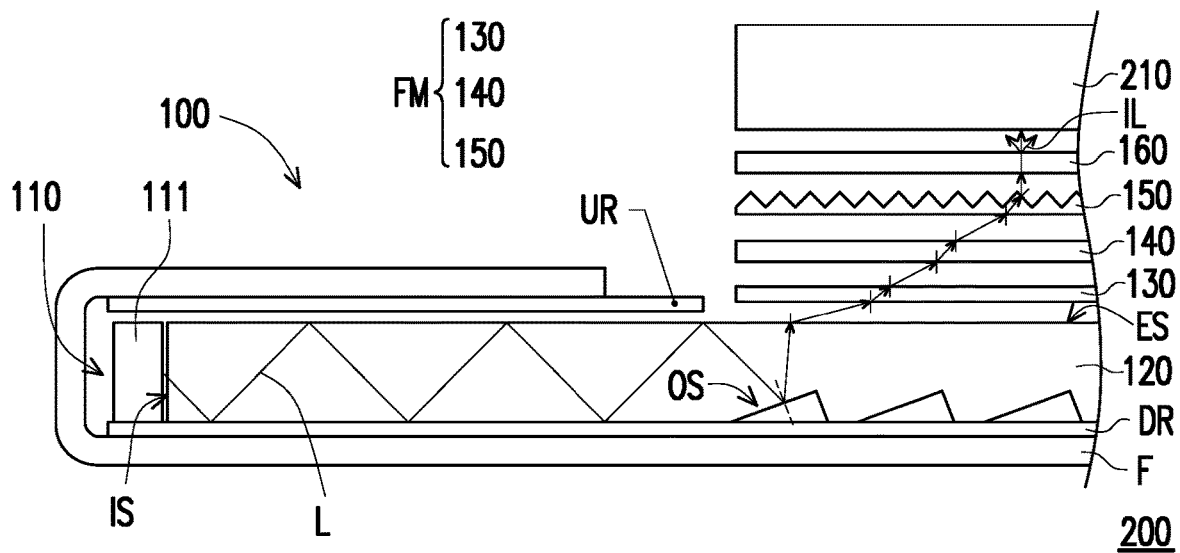
FIG. 1A is a schematic structural diagram of a display device according to an embodiment of the disclosure.
Figure 1B:
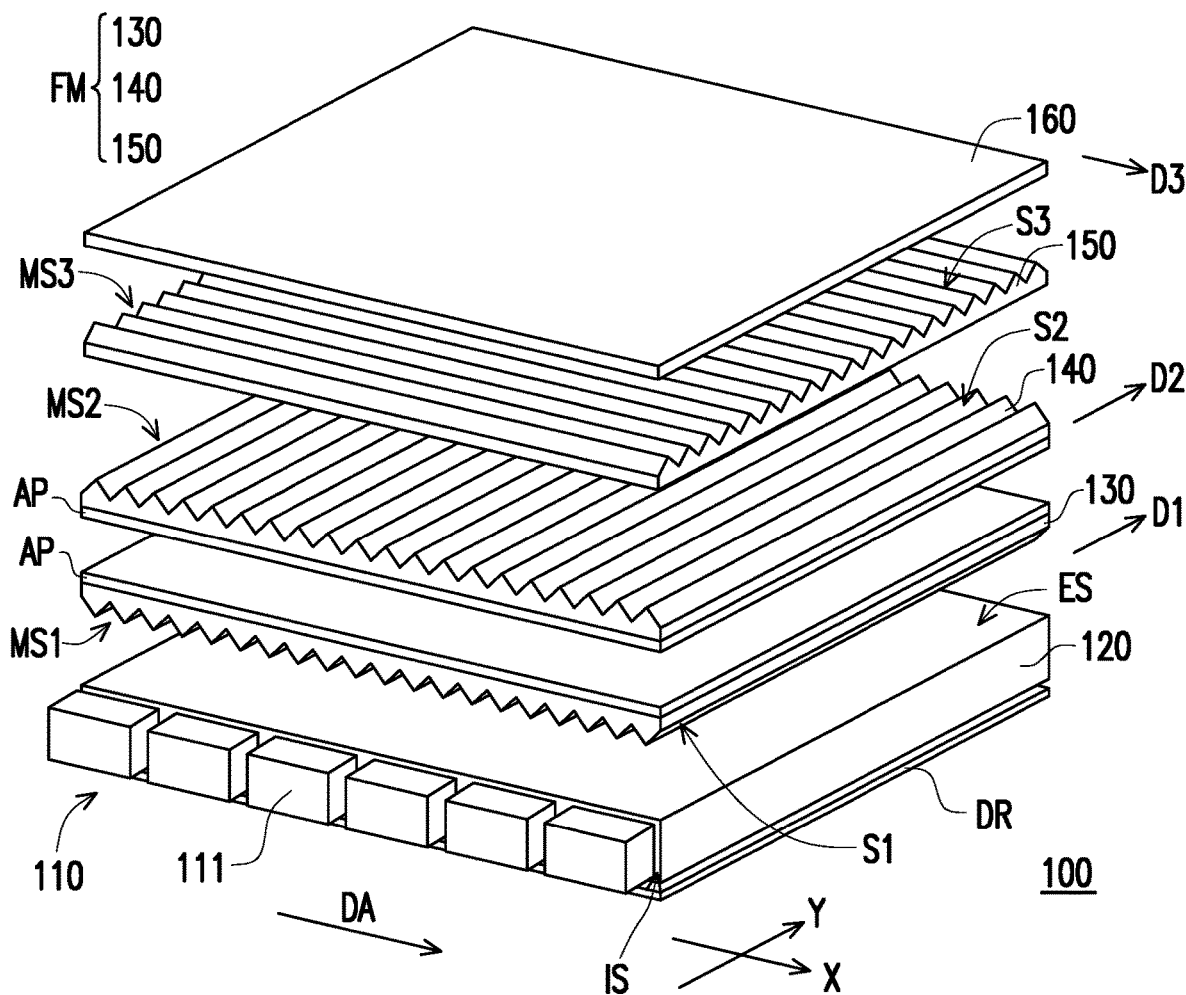
FIG. 1B is a schematic exploded diagram of the light source module of FIG. 1A.
Figure 2A:
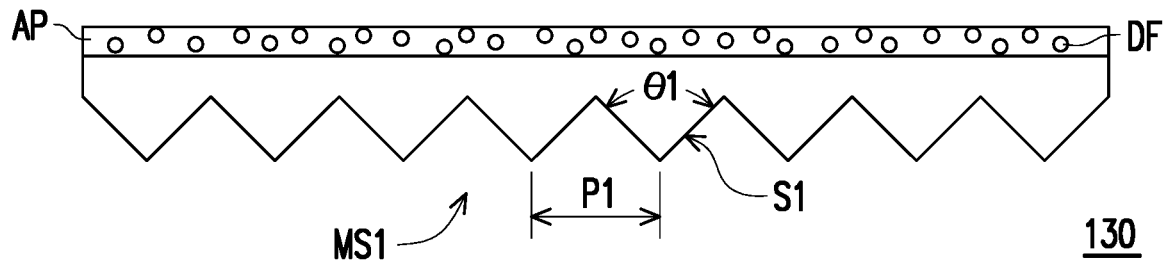
FIG. 2A is a schematic structural diagram of the first prism sheet of FIG. 1A.
Figure 2B:
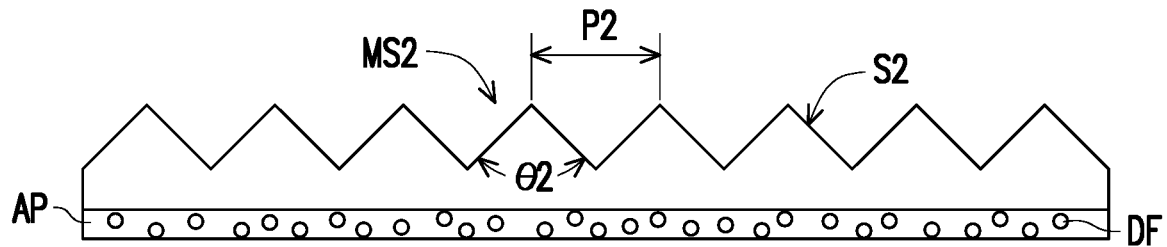
FIG. 2B is a schematic structural diagram of the second prism sheet of FIG. 1A.
Figure 2C:
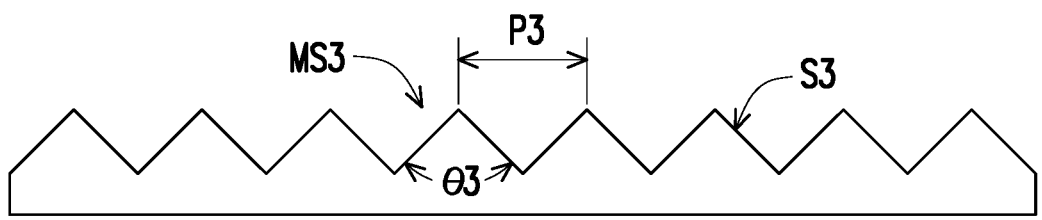
FIG. 2C is a schematic structural diagram of the third prism sheet of FIG. 1A.

FIG. 1A is a schematic structural diagram of a display device according to an embodiment of the disclosure. FIG. 1B is a schematic exploded diagram of the light source module of FIG. 1A. FIG. 2A is a schematic structural diagram of the first prism sheet of FIG. 1A. FIG. 2B is a schematic structural diagram of the second prism sheet of FIG. 1A. FIG. 2C is a schematic structural diagram of the third prism sheet of FIG. 1A. Referring to FIG. 1A and FIG. 1B, a display device 200 includes a light source module 100 and a display panel 210. The light source module 100 includes a light source 110, a light guide plate 120, a frame F, an upper reflector UR, a lower reflector DR, an optical film set FM, and an upper diffusion sheet 160, and the display panel 210 is located on the side of the optical film set FM away from the light guide plate 120. The light source 110 has multiple light emitting elements 111. A light incident surface IS of the light guide plate 120 faces the multiple light emitting elements 111, and the multiple light emitting elements 111 are arranged along the direction parallel to the light incident surface IS of the light guide plate 120. As shown in FIG. 1B, the light emitting element 111 is arranged along the X-axis direction, for example. For example, in the embodiment, the contour of the light guide plate 120 may be a flat plate or a wedge-shaped plate, and the disclosure is not limited thereto. In addition, a microstructure OS may be provided on the lower surface of the light guide plate 120 to destroy the total reflection of a light beam L transmitted in the light guide plate 120, so that the light beam L is transmitted to a light exiting surface ES of the light guide plate 120 to emit light. In the embodiment, the microstructure OS of the light guide plate 120 may be arranged in the form of laser dots, partial dots, or through grooves, and may be concave or convex relative to the lower surface of the light guide plate 120, and the disclosure is not limited thereto. It should be further explained that in FIG. 1B, in order to clearly show the arrangement of the light source 110, the light guide plate 120, the lower reflector DR, the optical film set FM, and the upper diffusion sheet 160, the upper reflector UR and the frame F are omitted.

Further, as shown in FIG. 1A and FIG. 1B, the optical film set FM overlaps the light exiting surface ES of the light guide plate 120. For example, in the embodiment, the optical film set FM includes a first prism sheet 130, a second prism sheet 140, and a third prism sheet 150. In addition, as shown in FIG. 1B, in the embodiment, the optical film set FM includes multiple first optical microstructures MS1, multiple second optical microstructures MS2, and multiple third optical microstructures MS3, and the multiple first optical microstructures MS1, the multiple second optical microstructures MS2, and the multiple third optical microstructures MS3 are, for example, prism microstructures. Furthermore, as shown in FIG. 1B, in the embodiment, the multiple first optical microstructures MS1 have a first surface S1, the multiple second optical microstructures MS2 have a second surface S2, and the multiple third optical microstructures MS3 have a third surface S3, and the first surface S1 is the surface of the first prism sheet 130 facing the light guide plate 120, the second surface S2 is the surface of the second prism sheet 140 away from the light guide plate 120, and the third surface S3 is the surface of the third prism sheet 150 away from the light guide plate 120. It should be further explained that, the first prism sheet 130, the second prism sheet 140, and the third prism sheet 150 are arranged upwards in sequence from the light exiting surface ES of the light guide plate 120.

That is to say, as shown in FIG. 1B, the second surface S2 is located on the side of the first surface S1 away from the light guide plate 120, and the second surface S2 is located between the first surface S1 and the third surface S3, and the multiple first optical microstructures MS1 faces the light guide plate 120, while the multiple second optical microstructures MS2 and the multiple third optical microstructures MS3 face away from the light guide plate 120. Moreover, as shown in FIG. 1B, in the embodiment, the multiple first optical microstructures MS1 extend along a first direction D1, the multiple second optical microstructures MS2 extend along a second direction D2, and the multiple third optical microstructures MS3 extend along a third direction D3. In the embodiment, the first direction D1 is parallel to the second direction D2, the third direction D3 is orthogonal to the first direction D1, and an arrangement direction DA of the multiple light emitting elements 111 is parallel to the third direction D3 and orthogonal to the first direction D1 and the second direction D2. The first direction D1 and the second direction D2 may also cross each other. For example, there may be an included angle between the first direction D1 and the second direction D2, and the range of the included angle may be between ±5°. It should be noted that the range of the included angle is not limited thereto.

Further, as shown in FIG. 2A to FIG. 2C, in the embodiment, each of the multiple first optical microstructures MS1 has an angle value θ1 of a first vertex angle, each of the multiple second optical microstructures MS2 has an angle value θ2 of a second vertex angle, and each of the multiple third optical microstructures MS3 has an angle value θ3 of a third vertex angle, and the angle value θ3 of the third vertex angle is less than the angle value θ1 of the first vertex angle, and the angle value θ1 of the first vertex angle is less than or equal to the angle value θ2 of the second vertex angle. Furthermore, in the embodiment, the angle value θ1 of the first vertex angle, the angle value θ2 of the second vertex angle, and the angle value θ3 of the third vertex angle of the light source module 100 satisfy the following relationship of $0.83 \leq \theta1/\theta2 \leq 1.14$ and $0.54 \leq \theta3/\theta2 \leq 0.80$. For example, in the embodiment, when the angle value θ1 of the first vertex angle and the angle value θ2 of the second vertex angle are 90°, the angle value of the angle value θ3 of the third vertex angle may be between 54° and 64°, and the best luminance value may be obtained when the angle value of the angle value θ3 of the third vertex angle is 60°.

On the other hand, as shown in FIG. 2A to FIG. 2C, in the embodiment, a pitch P1 of the multiple first optical microstructures MS1, a pitch P2 of the multiple second optical microstructures MS2, and a pitch P3 of the multiple third optical microstructures MS3 are less than or equal to 100 microns, but the disclosure is not limited thereto. In other embodiments, the pitch P1 of the multiple first optical microstructures MS1, the pitch P2 of the multiple second optical microstructures MS2, and the pitch P3 of the multiple third optical microstructures MS3 may be changed as required based on the pitch of the display device 200.

Moreover, as shown in FIG. 1B, FIG. 2A, and FIG. 2B, in the embodiment, the light source module 100 further includes an adhesion prevention structure AP. The adhesion prevention structure AP is disposed on the surface of the first prism sheet 130 and the second prism sheet 140 facing each other, and the surface may be a rough surface, so as to avoid the interference phenomenon (such as the Newton's ring) caused by the adhesion between the first prism sheet 130 and the second prism sheet 140 which in turn affects the visual effect. In addition, as shown in FIG. 2A and FIG. 2B, in the embodiment, the first prism sheet 130 and the second prism sheet 140 may include a diffusion particle DF to have haze. For example, in the embodiment, the haze of the first prism sheet 130 and the haze of the second prism sheet 140 are between 0% and 50%. In the embodiment, the diffusion particle DF is located in the adhesion prevention structure AP, but it is not limited thereto. In another embodiment, the diffusion particle DF may also be located in the first optical microstructure MS1 and the second optical microstructure MS2. It should be further explained that the adhesion prevention structure AP may be a photosensitive adhesive layer having the diffusion particle DF, and the aforementioned diffusion particle DF is covered by the photosensitive adhesive layer. The material of the photosensitive adhesive layer is, for example, a UV glue, or other suitable transparent photosensitive adhesive materials, and the material of the diffusion particle DF may include polymethyl methacrylate (PMMA), polystyrene (PS), or the copolymer of the above materials. On the other hand, in the embodiment, the diffusion particle DF may be spherical and have various particle sizes, but the disclosure is not limited thereto.

Thus, as shown in FIG. 1A, the light beam L provided by the light source 110 is reflected between the upper reflector UR and the lower reflector DR after exiting the light source 110, and travels in the light guide plate 120. Moreover, when passing through the microstructure OS, the total reflection behavior of the light beam L is destroyed, and may be transmitted to the light exiting surface ES of the light guide plate 120 to emit light. Next, the light beam L sequentially passes through the multiple first optical microstructures MS1, the multiple second optical microstructures MS2, and the multiple third optical microstructures MS3 of the optical film set FM located on the transmission path of the light beam L to form an illumination light beam IL. The display panel 210 is located on the transmission path of the illumination light beam IL, and may form a display image through the illumination light beam IL.

The light field distribution of the light beam L provided by the light source 110 after passing through different optical surfaces are further described below with reference to FIG. 3A to FIG. 3E.

FIG. 3A to FIG. 3E are respective schematic diagrams of light fields of the light beam L of FIG. 1A after passing through different optical surfaces. The areas filled with the same dotted patterns represent the value ranges having similar light field energy values, and areas with the denser distribution of the dots in the dotted patterns represent the value ranges with higher light field energy values (i.e., areas with higher luminance values). Further, referring to FIG. 3A, in the embodiment, FIG. 3A shows the light field energy distribution when the light beam L is emitted from the light guide plate 120. It should be noted that when leaving the light exit surface of the light guide plate 120, the light beam L deviates from the normal line and emit in a direction away from the light source 110. Next, when the light beam L passes through the first surface S1 provided with the multiple first optical microstructures MS1, since the first optical microstructure MS1 faces the light guide plate 120, and the extending directions of the multiple first optical microstructures MS1 are parallel to the travelling direction of the light beam L, the light field energy distribution of the light beam L may be divided into two halves after passing through the first optical microstructure MS1 to form the light field energy distribution as shown in FIG. 3B.

Next, when the light beam L passes through the second surface S2 provided with the multiple second optical microstructures MS2, since the second optical microstructure MS2 faces away from the light guide plate 120, and the extending directions of the multiple second optical microstructures MS2 are parallel to the travelling direction of the light beam L, the viewing angle of the light beam L in the horizontal direction (i.e., the X-axis direction as shown in FIG. 1B) may be converged after passing through the second optical microstructure MS2 to form the light field energy distribution as shown in FIG. 3C.

Next, when the light beam L passes through the third surface S3 provided with the multiple third optical microstructures MS3, since the third optical microstructure MS3 faces away from the light guide plate 120, and the extending direction of the third optical microstructure MS3 is orthogonal to the extending direction of the second optical microstructure MS2, the viewing angle of the light beam L in the vertical direction (i.e., the Y-axis direction as shown in FIG. 1B) may be converged after passing through the third optical microstructure MS3 to form the light field energy distribution as shown in FIG. 3D. In this way, the requirement of collimated light output may be realized.

Finally, the light beam L passes through the upper diffusion sheet 160, and may suppress the stray light and increase the concealment through the configuration of the upper diffusion sheet 160, thereby forming the light field energy distribution as shown in FIG. 3E. In addition, in the embodiment, in addition to using the upper diffusion sheet 160, a dual brightness enhancement film (DBEF) may also be used to replace the upper diffusion sheet 160, which may also have a similar effect.

In this way, through the configuration of the multiple first optical microstructures, the multiple second optical microstructures, and the multiple third optical microstructures of the optical film set FM, the light source module 100 may greatly improve the collimation of light and realize the viewing angle of the output light shape having a small enough full width half maximum (FWHM) in the horizontal and vertical directions. For example, the full width half maximum (FWHM) of the viewing angle of the output light shape of the light source module 100 in the horizontal and vertical directions may be kept within 24°. In this way, the illumination light beam IL provided by the light source module 100 may be concentrated toward a specific viewing angle to meet the requirement of collimated light output, thereby enabling the display device 200 to realize the anti-peeping function. Further description is made below with reference to FIG. 4 and FIG. 5.

Figure 4:
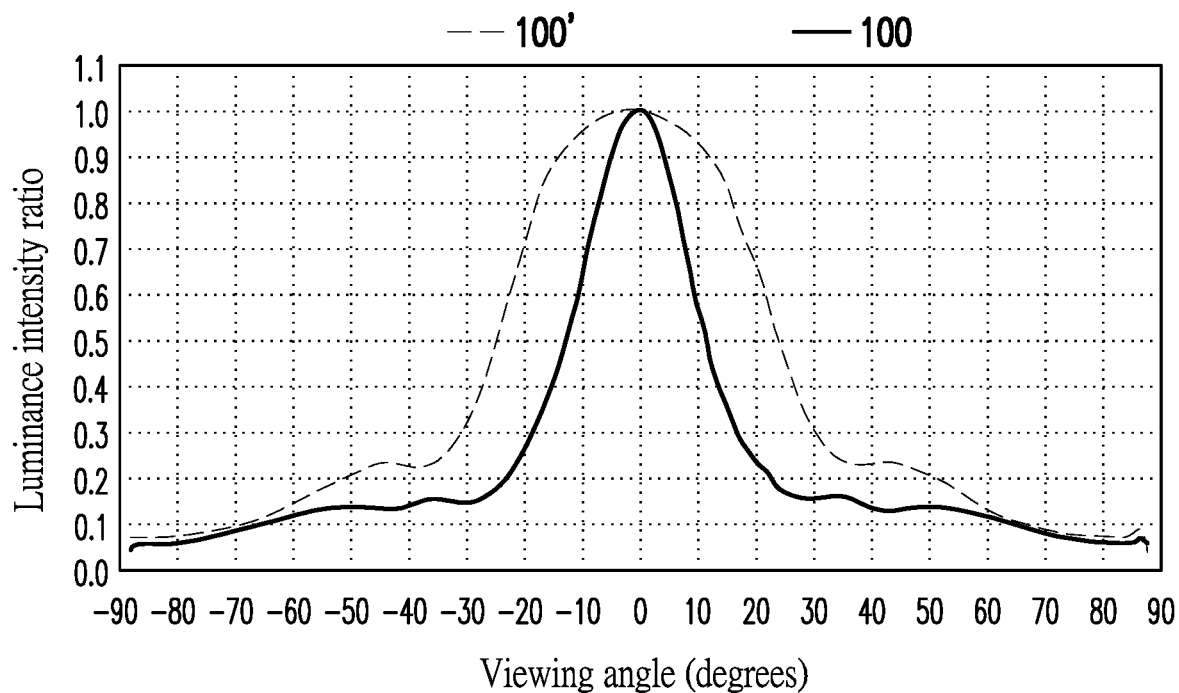
FIG. 4 and FIG. 5 are respective relationship diagrams between viewing angles and the luminance intensity ratios of the illumination light beam of the light source module of FIG. 1A in horizontal and vertical directions.
Figure 5:
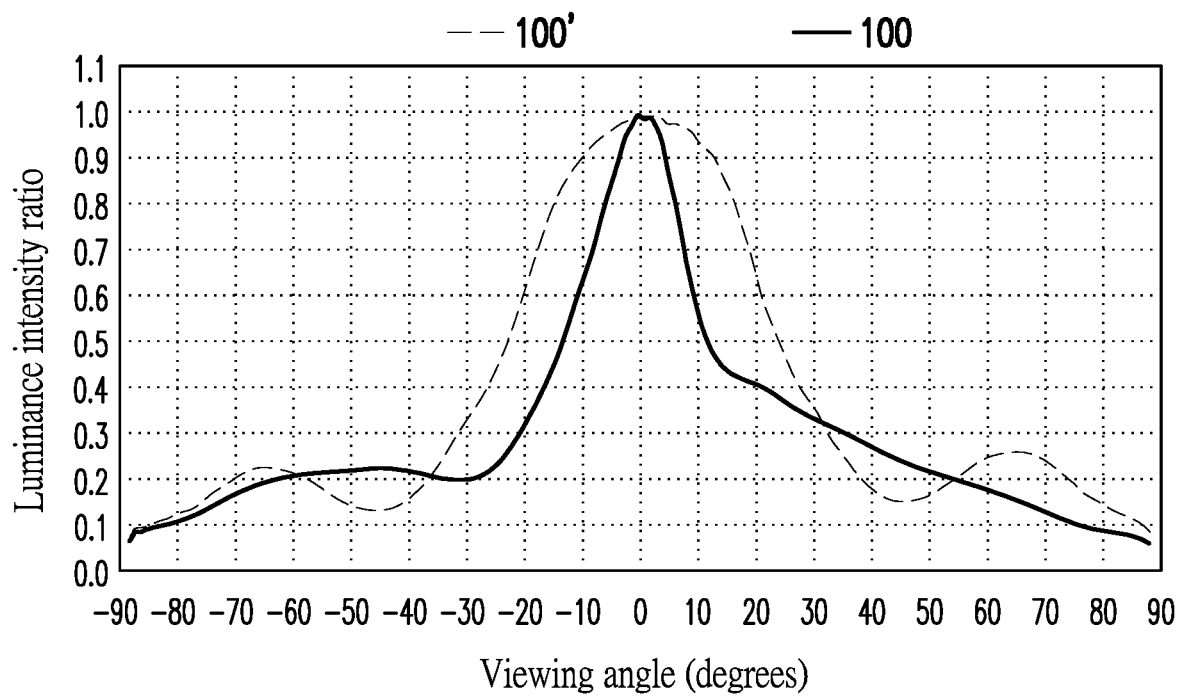

FIG. 4 and FIG. 5 are respective relationship diagrams between viewing angles and the luminance intensity ratios of the illumination light beam IL of the light source module 100 of FIG. 1A in horizontal and vertical directions. First of all, it should be noted that the structure of an existing light source module 100' shown in FIG. 4 and FIG. 5 is the same as the structure of the light source module 100 of the disclosure. The difference is that, in the light source module 100, there is the first prism sheet 130 including the first optical microstructure MS1 between the two frontal prism sheets (the second prism sheet 140 and the third prism sheet 150) and the light guide plate 120, and in the light source module 100', there is the lower diffusion sheet between the two frontal prism sheet and the light guide plate. As such, as shown in FIG. 4 and FIG. 5, the illumination light beam IL provided by the existing light source module 100' has a 48° full width half maximum (FWHM) of the horizontal viewing angle, and a 44° full width half maximum (FWHM) of the vertical viewing angle. In contrast, the illumination light beam IL provided by the light source module 100 has a 24° full width half maximum (FWHM) of the horizontal viewing angle, and a 21° full width half maximum (FWHM) of the vertical viewing angle, which may greatly reduce the full width half maximum (FWHM) of the light field compared with the existing light source module 100', with the peak of the horizontal viewing angle being −1°, and the peak of the vertical viewing angle being 0°. It may be seen that the light source module 100 of the disclosure not only greatly improves the collimation of light, but also improves the optical utilization rate, so that the luminance gain is increased by 20% compared with the existing light source module 100', thereby reducing the energy consumption of the light source module 100 and the display device 200.

In addition, it is worth noting that in the foregoing embodiments, although the multiple first optical microstructures MS1, the multiple second optical microstructures MS2, and the multiple third optical microstructures MS3 have the regular shapes with the fixed pitches P1, P2, and P3 and fixed heights as examples, the disclosure is not limited thereto. In other embodiments, the multiple first optical microstructures MS1, the multiple second optical microstructures MS2, and the multiple third optical microstructures MS3 may have irregular shapes with unequal pitches P1, P2, P3 and/or unequal heights. Further description is made below with reference to FIG. 6A to FIG. 6E.

Figure 6A:
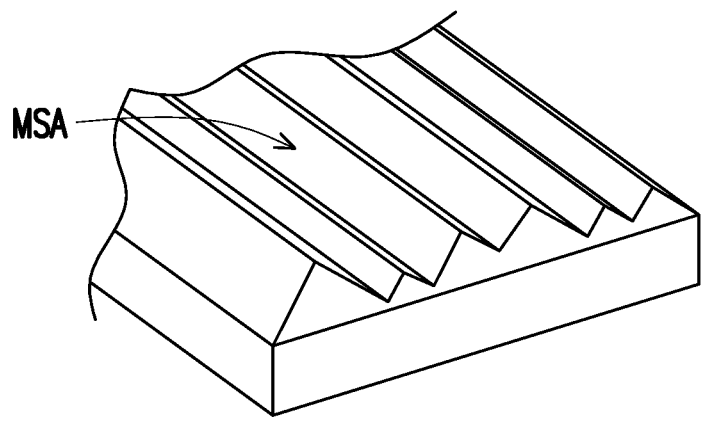
FIG. 6A to FIG. 6E are respective structural schematic diagrams of different prism microstructures according to various embodiments of the disclosure.
Figure 6B:
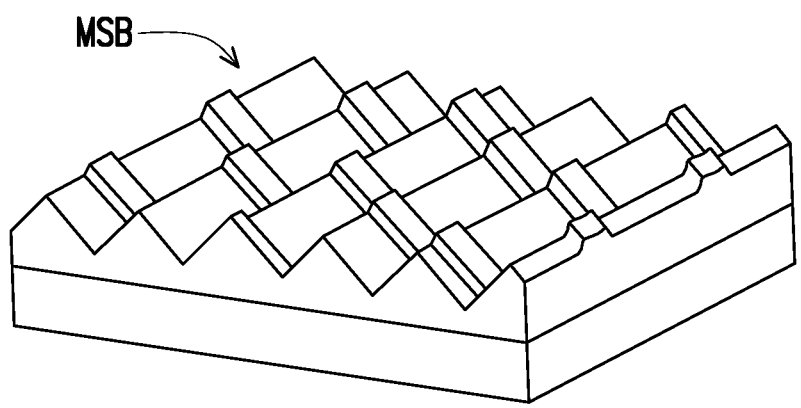
Figure 6C:
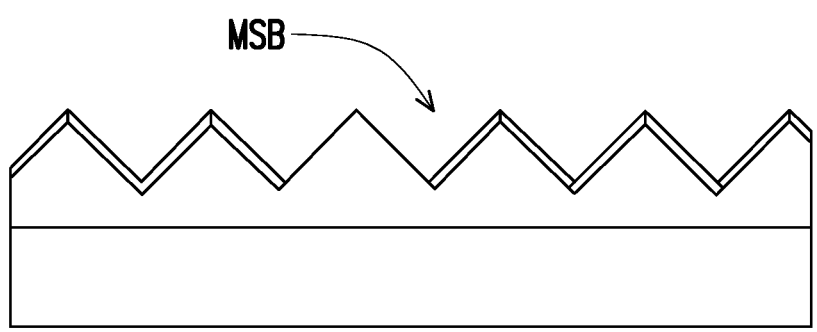
Figure 6D:
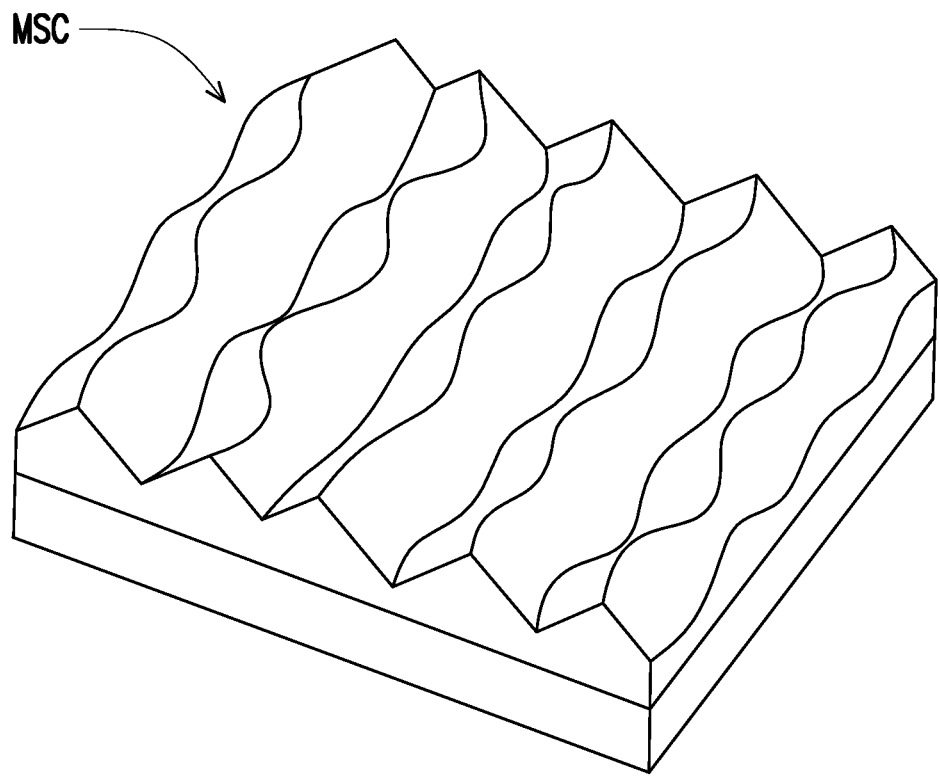
Figure 6E:
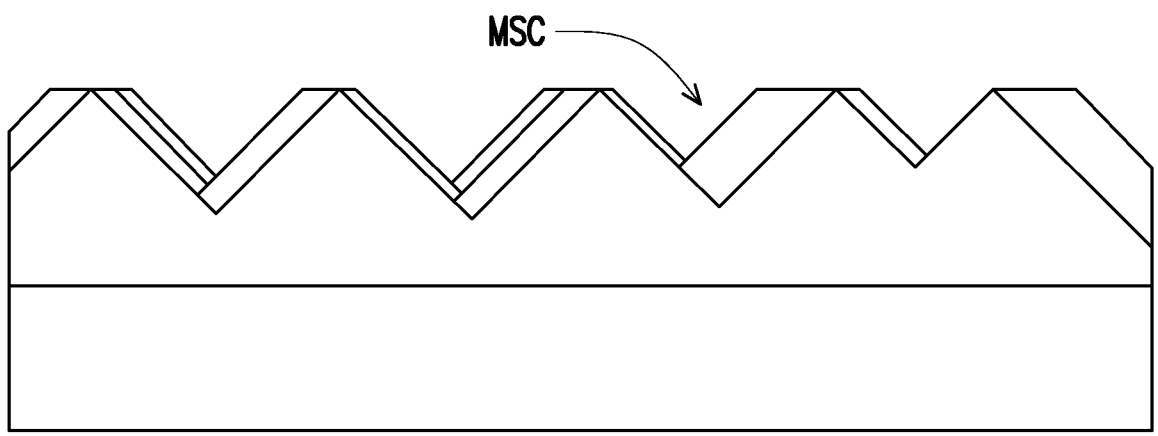

FIG. 6A to FIG. 6E are respective structural schematic diagrams of different prism microstructures according to various embodiments of the disclosure. For example, the multiple first optical microstructures MS1, the multiple second optical microstructures MS2, and the multiple third optical microstructures MS3 may all be formed in the form of multiple prism microstructures MSA as shown in FIG. 6A, and between the multiple prism microstructures MSA, there are unequal pitches and unequal height changes. Alternatively, the multiple first optical microstructures MS1, the multiple second optical microstructures MS2, and the multiple third optical microstructures MS3 may also be formed in the form of multiple prism microstructures MSB as shown in FIG. 6B and FIG. 6C, and each prism microstructure MSB has an unequal height change in the extending direction and a contour appearing in an irregular shape that swings up and down. Alternatively, the multiple first optical microstructures MS1, the multiple second optical microstructures MS2, and the multiple third optical microstructures MS3 may also be formed in the form of multiple prism microstructures MSC as shown in FIG. 6D and FIG. 6E, and between the multiple prism microstructures MSCs, there are unequal pitch changes, and the contour of each prism microstructure MSC appears in an irregular shape that swings up and down in the extending direction.

When the multiple first optical microstructures MS1, the multiple second optical microstructures MS2, and the multiple third optical microstructures MS3 adopt any one of the prism microstructures MSA, MSB, and MSC in FIG. 6A to FIG. 6E, as long as the relationship between the angle value θ1 of the first vertex angle, the angle value θ2 of the second vertex angle, and the angle value θ3 of the third vertex angle is the same as the relationship of the foregoing embodiments, the light source module 100 and the display device 200 may still achieve the aforementioned effects and advantages, and so repetition is omitted here.

In addition, it should be noted that in the aforementioned embodiments, although the arrangement direction DA of the multiple light emitting elements 111 is parallel to the third direction D3 and orthogonal to the first direction D1 and the second direction D2, the disclosure is not limited thereto. In other embodiments, the extending direction of the first optical microstructure MS1, the second optical microstructure MS2, and the third optical microstructure MS3 may be appropriately adjusted relative to the arrangement direction DA of the light emitting elements 111. Further description is made below with reference to FIG. 7A to FIG. 7C.

Figure 7A:
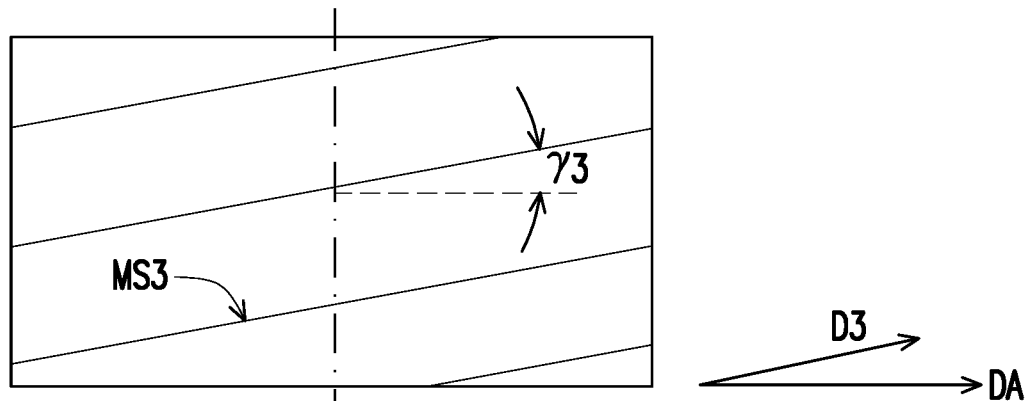
FIG. 7A to FIG. 7C are schematic diagrams showing relative positions of extending directions of a first optical microstructure, a second optical microstructure, and a third optical microstructure with respect to an arrangement direction of a light emitting element according to another embodiment of the disclosure.
Figure 7B:
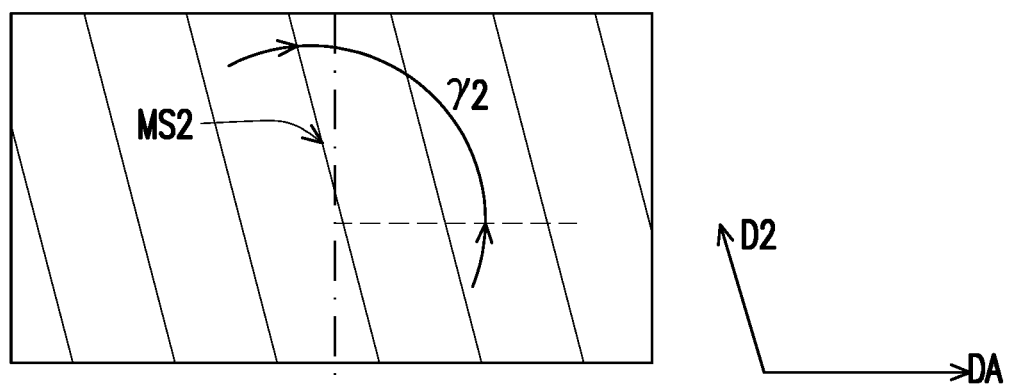
Figure 7C:
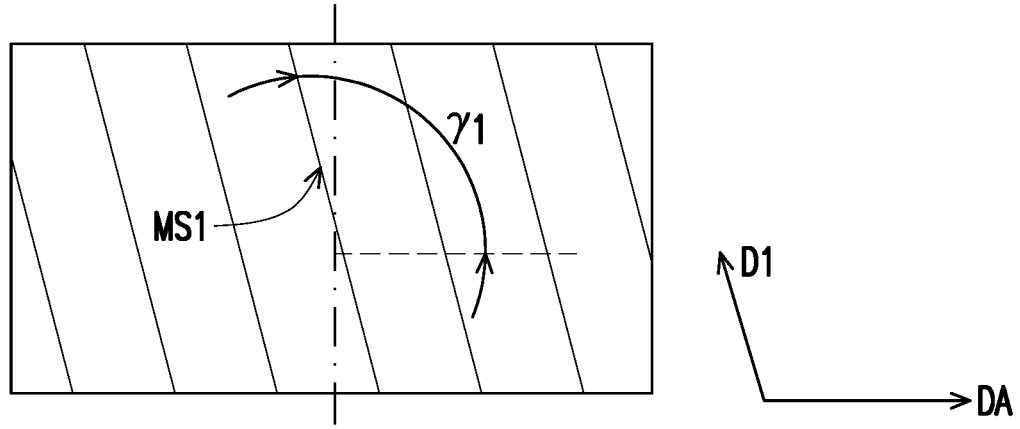

FIG. 7A to FIG. 7C are schematic diagrams showing relative positions of extending directions of the first optical microstructure MS1, the second optical microstructure MS2, and the third optical microstructure MS3 with respect to the arrangement direction DA of the light emitting element 111 according to another embodiment of the disclosure. The multiple first optical microstructures MS1 extend along the first direction D1, the multiple second optical microstructures MS2 extend along the second direction D2, and the multiple third optical microstructures MS3 extend along the third direction D3. Referring to FIG. 7A to FIG. 7C, in the embodiment, the light source module 100 may make an included angle γ1 between the arrangement direction DA of the multiple light emitting elements 111 and the first direction D1 to be between 80° and 100°. In addition, the angle value of an included angle γ2 between the arrangement direction DA of the corresponding multiple light emitting elements 111 and the second direction D2 is also between 80° and 100°, and the angle value of an included angle γ3 between the arrangement direction DA of the multiple light emitting elements 111 and the third direction D3 is between −10° and 10°. In this way, the optical elements in the light source module 100 may avoid interference fringes (Moiré pattern) generated by the periodic structure (such as the microstructure OS of the light guide plate 120 or the first optical microstructure MS1, the second optical microstructure MS2, and the third optical microstructure MS3 of the optical film set FM) and the display pixel of the display panel 210.

In addition, it is worth noting that in the foregoing embodiments, the optical film set FM includes the first prism sheet 130, the second prism sheet 140, and the third prism sheet 150, but the disclosure is not limited thereto. In other embodiments, the optical film set FM may only include a first prism sheet 130A and the third prism sheet 150. Further description is made below with reference to FIG. 8A and FIG. 8B.

Figure 8A:
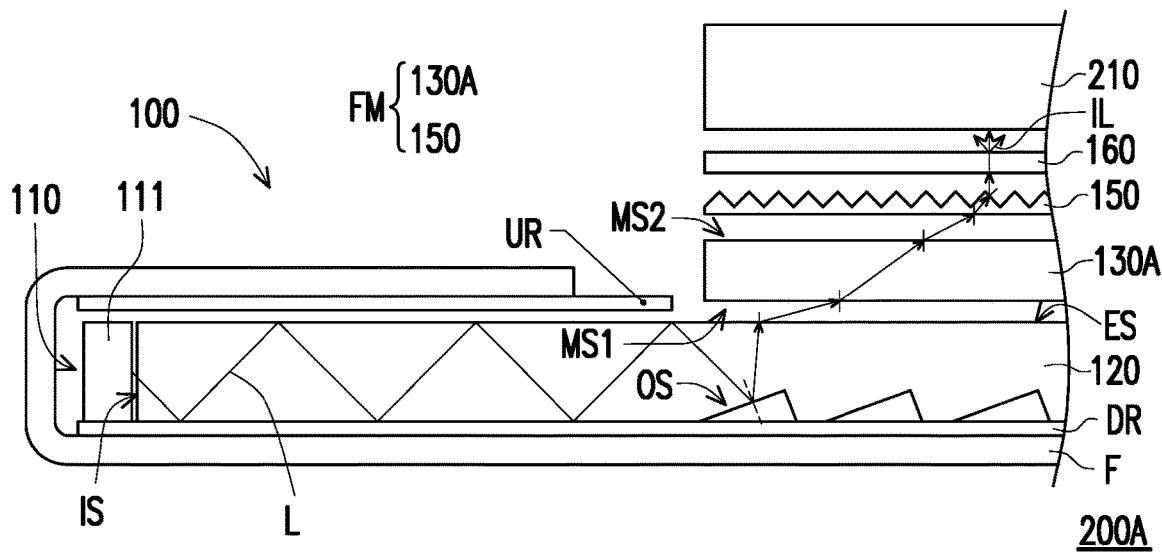
FIG. 8A is a schematic structural diagram of a display device according to yet another embodiment of the disclosure.
Figure 8B:
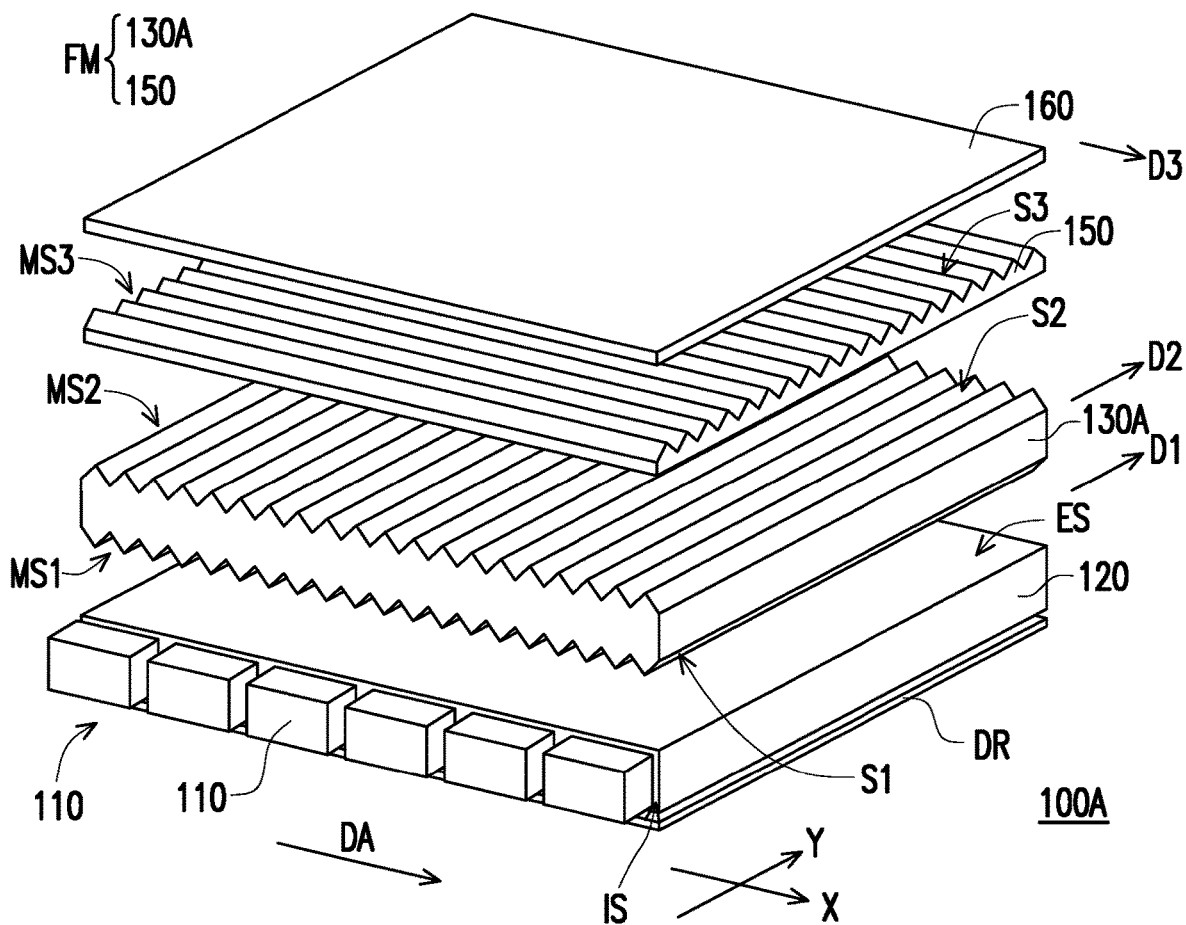
FIG. 8B is a schematic exploded diagram of the light source module of FIG. 8A.

FIG. 8A is a schematic structural diagram of a display device according to yet another embodiment of the disclosure. FIG. 8B is a schematic exploded diagram of the light source module of FIG. 8A. Referring to FIG. 8A and FIG. 8B, in the embodiment, a light source module 100A and a display device 200A are similar to the light source module 100 and the display device 200 in FIG. 1A and FIG. 1B, and the differences between the two are as follows. In the embodiment, the optical film set FM of the light source module 100A only includes the first prism sheet 130A and the third prism sheet 150, and the first surface S1 provided with the first optical microstructure MS1 is the surface of the first prism sheet 130A facing the light guide plate 120, and the second surface S2 provided with the second optical microstructure MS2 is the surface of the first prism sheet 130A away from the light guide plate 120. Moreover, in the embodiment, the angle value θ1 of the first vertex angle, the angle value θ2 of the second vertex angle, and the angle value θ3 of the third vertex angle of the light source module 100A satisfy the following relationship of 0.83≤θ1/θ2≤1.14 and 0.47≤θ3/θ2≤0.89. For example, in the embodiment, when the angle value θ1 of the first vertex angle and the angle value θ2 of the second vertex angle are 90°, the angle value of the angle value θ3 of the third vertex angle may be between 47° and 71°. In the embodiment, the first prism sheet 130A has a haze, and the haze of the first prism sheet 130A is between 0% and 50%. It should be further explained that in FIG. 8B, in order to clearly show the arrangement of the light source 110, the light guide plate 120, the lower reflector DR, the optical film set FM, and the upper diffusion sheet 160, the upper reflector UR and the frame F are omitted.

In this way, the thickness of the light source module 100A may be thinned by forming the first optical microstructure MS1 and the second optical microstructure MS2 on the surfaces of both sides of the first prism sheet 130A. Moreover, through the configuration of the multiple first optical microstructures MS1, the multiple second optical microstructures MS2, and the multiple third optical microstructures MS3 of the optical film set FM, the light source module 100A may also greatly improve the collimation of light and realize the viewing angle of the output light shape having a small enough full width half maximum (FWHM) in the horizontal and vertical directions. For example, the full width half maximum (FWHM) of the light source module 100A in the horizontal and vertical directions may be 30° and 18° respectively, and the luminance gain may also be increased by 21% compared with the existing light source module 100'.

In this way, the illumination light beam IL provided by the light source module 100A may also meet the requirement of collimated light output and achieve effects and advantages similar to the aforementioned light source module 100, and so repetition is omitted here. Moreover, the display device 200A using the light source module 100A may also achieve effects and advantages similar to the aforementioned display device 200, and so repetition is omitted here.

To sum up, in the light source module and the display device of the embodiment of the disclosure, through the configuration of the multiple first optical microstructures, the multiple second optical microstructures, and the multiple third optical microstructures of the optical film, the light source module may greatly improve the collimation of light and realize the viewing angle of the output light shape having a small enough full width half maximum (FWHM) in the horizontal and vertical directions. For example, the full width half maximum (FWHM) of the viewing angle of the output light shape of the light source module in the horizontal and vertical directions may be kept within 24°. In this way, the illumination light beam provided by the light source module may be concentrated toward a specific viewing angle to meet the requirement of collimated light output, thereby enabling the display device to realize the anti-peeping function. In addition, the light source module also improves the optical utilization rate and has favorable luminance, thereby reducing the energy consumption of the light source module and the display device and enabling the display device to have a favorable image quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A light source module, comprising:
   a light source, having a plurality of light emitting elements;
   a light guide plate, wherein a light incident surface of the light guide plate faces the plurality of light emitting elements; and
   an optical film set, overlapping a light exiting surface of the light guide plate, wherein the optical film set comprises:
      a plurality of first optical microstructures, having a first surface, wherein the plurality of first optical microstructures extend along a first direction, and the plurality of first optical microstructures face the light guide plate;
      a plurality of second optical microstructures, having a second surface, wherein the second surface is located on a side of the first surface away from the light guide plate, the plurality of second optical microstructures extend along a second direction, the first direction is parallel to the second direction, and the plurality of second optical microstructures face away from the light guide plate; and
      a plurality of third optical microstructures, having a third surface, wherein the second surface is located between the first surface and the third surface, the plurality of third optical microstructures extend along a third direction, the plurality of third optical microstructures face away from the light guide plate, and the third direction is orthogonal to the first direction, and
      each of the plurality of first optical microstructures has a first vertex angle, each of the plurality of second optical microstructures has a second vertex angle, each of the plurality of third optical microstructures has a third vertex angle, the third vertex angle is less than the first vertex angle, and the first vertex angle is less than or equal to the second vertex angle.

2. The light source module according to claim 1, wherein the light source module satisfies relationships of $0.83 \leq \theta1/\theta2 \leq 1.14$ and $0.54 \leq \theta3/\theta2 \leq 0.80$, and $\theta1$ is an angle value of the first vertex angle, $\theta2$ is an angle value of the second vertex angle, and $\theta3$ is an angle value of the third vertex angle.

3. The light source module according to claim 1, wherein there is an included angle between an arrangement direction of the plurality of light emitting elements and the first direction, and an angle value of the included angle is between 80° and 100°.

4. The light guide plate according to claim 1, wherein the plurality of first optical microstructures, the plurality of second optical microstructures, and the plurality of third optical microstructures are prism microstructures, and the optical film set comprises:
   a first prism sheet, wherein the first surface is a surface of the first prism sheet facing the light guide plate;
   a second prism sheet, wherein the second surface is a surface of the second prism sheet away from the light guide plate; and
   a third prism sheet, wherein the third surface is a surface of the third prism sheet away from the light guide plate.

5. The light source module according to claim 4, wherein an angle value of the third vertex angle is between 54° and 64°.

6. The light source module according to claim 4, further comprising:
   an adhesion prevention structure, disposed on surfaces of the first prism sheet and the second prism sheet facing each other.

7. The light source module according to claim 4, wherein the first prism sheet and the second prism sheet have haze, and the haze of the first prism and second prism sheet is between 0% and 50%.

8. The light source module according to claim 1, wherein the plurality of first optical microstructures, the plurality of second optical microstructures, and the plurality of third optical microstructures are prism microstructures, and the optical film set comprises:
   a first prism sheet, wherein the first surface is a surface of the first prism sheet facing the light guide plate, and the second surface is a surface of the first prism sheet away from the light guide plate; and
   a third prism sheet, wherein the third surface is a surface of the third prism sheet away from the light guide plate.

9. The light source module according to claim 8, wherein an angle value of the third vertex angle is between 47° and 71°.

10. The light source module according to claim 8, wherein the first prism sheet has haze, and the haze of the first prism sheet is between 0% and 50%.

11. The light source module according to claim 1, wherein the light source module satisfies relationships of $0.83 \leq \theta_1/\theta_2 \leq 1.14$ and $0.47 \leq \theta_3/\theta_2 \leq 0.89$, and $\theta_1$ is an angle value of the first vertex angle, $\theta_2$ is an angle value of the second vertex angle, and $\theta_3$ is an angle value of the third vertex angle.

12. A display device, comprising:
a light source module, comprising:
   a light source, having a plurality of light emitting elements;
   a light guide plate, wherein a light incident surface of the light guide plate faces the plurality of light emitting elements; and
   an optical film set, overlapping a light exiting surface of the light guide plate, wherein the optical film set comprises:
      a plurality of first optical microstructures, having a first surface, wherein the plurality of first optical microstructures extend along a first direction, and the plurality of first optical microstructures face the light guide plate;
      a plurality of second optical microstructures, having a second surface, wherein the second surface is located on a side of the first surface away from the light guide plate, the plurality of second optical microstructures extend along a second direction, the first direction is parallel to the second direction, and the plurality of second optical microstructures face away from the light guide plate; and
      a plurality of third optical microstructures, having a third surface, wherein the second surface is located between the first surface and the third surface, the plurality of third optical microstructures extend along a third direction, the plurality of third optical microstructures face away from the light guide plate, and the third direction is orthogonal to the first direction, and
      each of the plurality of first optical microstructures has a first vertex angle, each of the plurality of second optical microstructures has a second vertex angle, each of the plurality of third optical microstructures has a third vertex angle, the third vertex angle is less than the first vertex angle, and the first vertex angle is less than or equal to the second vertex angle; and
a display panel, located on a side of the optical film set away from the light guide plate.

* * * * *